US012649302B2

(12) United States Patent
Alaboson et al.

(10) Patent No.: US 12,649,302 B2
(45) Date of Patent: Jun. 9, 2026

(54) MULTILAYER FILMS AND ARTICLES COMPRISING MULTILAYER FILMS

(71) Applicant: Dow Global Technologies LLC, Midland, MI (US)

(72) Inventors: Justice Alaboson, Rosharon, TX (US); Vivek Kalihari, Missouri City, TX (US); Rahul Sharma, Pearland, TX (US); Jacquelyn A. Degroot, Sugarland, TX (US); Nicolas C. Mazzola, Pearland, TX (US); Amit K. Chaudhary, Missouri City, TX (US); Barry A. Morris, Wilmington, DE (US)

(73) Assignee: Dow Global Technologies LLC, Midland, MI (US)

( * ) Notice: Subject to any disclaimer, the term of this patent is extended or adjusted under 35 U.S.C. 154(b) by 213 days.

(21) Appl. No.: 18/704,123

(22) PCT Filed: Dec. 14, 2022

(86) PCT No.: PCT/US2022/081568

§ 371 (c)(1),
(2) Date: Apr. 24, 2024

(87) PCT Pub. No.: WO2023/114854

PCT Pub. Date: Jun. 22, 2023

(65) Prior Publication Data

US 2026/0131560 A1 May 14, 2026

Related U.S. Application Data

(60) Provisional application No. 63/265,514, filed on Dec. 16, 2021.

(51) Int. Cl.

| | |
|---|---|
| ***B32B 27/08*** | (2006.01) |
| ***B32B 27/30*** | (2006.01) |
| ***B32B 27/32*** | (2006.01) |

(52) U.S. Cl.

CPC ........... *B32B 27/08* (2013.01); *B32B 27/306* (2013.01); *B32B 27/32* (2013.01); *B32B 2250/05* (2013.01);

(Continued)

(58) Field of Classification Search

CPC ............. Y10T 428/13; Y10T 428/1334; Y10T 428/1341; Y10T 428/1352; Y10T 428/1379; Y10T 428/1383; Y10T 428/139; Y10T 428/24942; Y10T 428/2495; Y10T 428/24959; Y10T 428/24967; Y10T 428/26; Y10T 428/266; Y10T 428/269; Y10T 428/28; Y10T 428/2813; Y10T 428/2817; Y10T 428/2826; Y10T 428/2848; Y10T 428/2852; Y10T 428/2878; Y10T 428/31663; Y10T 428/31667; Y10T 428/31725; Y10T 428/31728; Y10T 428/31732; Y10T 428/31736; Y10T 428/31739; Y10T 428/31743; Y10T 428/31746; Y10T 428/3175; Y10T 428/31757; Y10T 428/31786; Y10T 428/31797; Y10T 428/31855; Y10T 428/31909; Y10T 428/31913; Y10T 428/31938; B32B 7/00; B32B 7/04; B32B 7/12; B32B 27/00; B32B 27/04; B32B 27/06; B32B 27/08; B32B 27/18; B32B 27/28; B32B 27/283; B32B 27/30; B32B 27/306; B32B 2323/04; B32B 2323/043; B32B 2323/046; B32B 2323/10; B32B 2383/00; B32B 2439/00; B32B 2439/46; B32B 2439/70; B65D 33/00; B65D 81/24; C08L 23/00; C08L 23/02; C08L 23/04; C08L 23/06; C08L 23/08; C08L 23/0807; C08L 23/0815; C08L 83/00; C08L 83/04; C08L 83/06; C08L 83/08; C08L 2203/16; C08L 2203/162; C08L 2207/06; C08L 2207/062; C08L 2207/064; C08L 2207/066

USPC ......... 428/34.1, 35.2, 35.4, 35.7, 36.6, 36.7, 428/212, 213, 214, 215, 220, 332, 337, 428/339, 343, 346, 347, 349, 354, 355 R, (Continued)

(56) References Cited

U.S. PATENT DOCUMENTS

| | | | |
|---|---|---|---|
| 6,080,489 | A | 6/2000 | Mehta |
| 6,291,063 | B1 | 9/2001 | Shah et al. |

(Continued)

FOREIGN PATENT DOCUMENTS

| | | | | |
|---|---|---|---|---|
| CN | 102673060 | | 9/2012 | |
| EP | 3412453 | A1 * | 12/2018 | ............. C08L 23/08 |

(Continued)

OTHER PUBLICATIONS

Lernoux, VistamaxxTM Performance Polymer and ExceedTM XP Performance Polymer for Exceptional Flex-crack Resistance, 2017.

*Primary Examiner* — Maria V Ewald
*Assistant Examiner* — Ethan A. Utt
(74) *Attorney, Agent, or Firm* — Jacob R. Graham

(57) ABSTRACT

Embodiments of the present invention relate to multilayer films, laminates, and articles. In one aspect, a multilayer film includes at least three layers: (a) a first layer. (b) a second layer, and (c) a third layer. Among other features, the second layer includes from 0.05 weight percent to 5.0 weight percent of at least one polydimethylsiloxane, based on the total weight of the second layer, wherein at least one of the poly dimethylsiloxane has a weight average molecular weight, Mw, of from 20,000 g/mol to 700,000 g/mol.

17 Claims, No Drawings

(52) U.S. Cl.
CPC ....... *B32B 2250/24* (2013.01); *B32B 2307/30* (2013.01); *B32B 2307/72* (2013.01); *B32B 2307/7376* (2023.05)

(58) Field of Classification Search
USPC ...... 428/355 EN, 446, 447, 448, 451, 474.4, 428/474.7, 474.9, 475.2, 475.5, 475.8, 428/476.1, 476.3, 476.9, 480, 483, 500, 428/515, 516, 523; 220/62.11, 62.12, 220/62.13, 62.22; 524/261, 262, 263, 524/264, 265, 266, 267, 268, 269, 502, 524/543, 582, 583, 585, 587, 588; 525/50, 55, 185, 474, 477, 479
See application file for complete search history.

(56) References Cited

U.S. PATENT DOCUMENTS

| | | | | |
|---|---|---|---|---|
| 6,472,077 | B1 | 10/2002 | Cretekos et al. | |
| 6,682,822 | B2 | 1/2004 | Cretekos et al. | |
| 2001/0021460 | A1 | 9/2001 | Kong et al. | |
| 2003/0211298 | A1 | 11/2003 | Migliorini et al. | |
| 2009/0061061 | A1 * | 3/2009 | Beckwith | B29C 48/21 426/546 |
| 2012/0107542 | A1 * | 5/2012 | Nelson | B32B 27/306 428/218 |
| 2013/0209756 | A1 | 8/2013 | Squier et al. | |
| 2017/0233507 | A1 * | 8/2017 | Li | C08L 23/04 525/240 |
| 2018/0361722 | A1 * | 12/2018 | Ambroise | B32B 27/302 |
| 2020/0199336 | A1 * | 6/2020 | Ongayi | B32B 27/283 |
| 2021/0079311 | A1 | 3/2021 | Llop et al. | |

FOREIGN PATENT DOCUMENTS

| | | | | |
|---|---|---|---|---|
| EP | 3412454 | A1 * | 12/2018 | B32B 27/18 |
| WO | 2000039231 | | 7/2000 | |
| WO | 2000040406 | | 7/2000 | |
| WO | 2002090091 | | 11/2002 | |
| WO | 2018071742 | | 4/2018 | |
| WO | 2019055371 | | 3/2019 | |
| WO | 2020123507 | | 6/2020 | |
| WO | 2021021354 | | 2/2021 | |

* cited by examiner

MULTILAYER FILMS AND ARTICLES COMPRISING MULTILAYER FILMS

FIELD

This disclosure relates to multilayer films and to articles comprising multilayer films.

INTRODUCTION

Flexible food packaging films can consist of multi-component materials that are necessary to meet film property targets such as oxygen and moisture barrier, easy open functionality, stiffness, toughness, good printability, and high sealing rates, among others. With such packaging films, barrier components are critical to extend food shelf life, to reduce food waste, and to increase the overall food and package sustainability profile. Traditionally, ethylene vinyl alcohol (EVOH), metallized coatings, and HDPE have been used in flexible films to provide a high barrier to oxygen and/or moisture. However, these barrier components are brittle and can suffer flex crack failures in packaging application, resulting in severe barrier degradation when the films are flexed during handling and transportation.

Many applications require a certain level of flex crack performance, typically measured using Gelbo flex crack resistance. To achieve a desirable performance, some film converters have been exploring the use of complex film structures consisting of multi-component materials. Multi-component structures have, in general, higher raw material costs than all polyolefin structures. In addition to costs, not all film converters are equipped to run a variety of materials as some materials require special extrusion equipment which may have special maintenance needs. In addition, there may be product losses due to a film structure being out of specification as manufacturing lines are purged when transitioning from one film structure to the other.

Furthermore, multilayer structures that incorporate a variety of materials, including, for example, polypropylene, polyamide, and polyethylene terephthalate, are widely used in food packaging. Such structures often require desirable properties such as flex crack performance—for example, to avoid breakage during transport. The combination of layers and materials can allow for good performance, but such multilayer structures can be difficult, if not impossible, to recycle together due to the different types of materials that are not recycle-compatible with each other.

There remains a need for new film structures that are more sustainable, less costly, and can provide desirable properties such as flex crack performance.

SUMMARY

The present invention provides multilayer films that can be used, in some embodiments, for packaging of liquids. According to some embodiments, multilayer films of the present invention can provide desirable flex crack performance when incorporated into bags and flexible food packaging. In some embodiments, multilayer films can advantageously provide desirable flex crack performance while also being composed substantially of a single type of polyolefin (e.g., all polyethylene or all polypropylene). Such embodiments advantageously provide a desirable level of flex crack resistance while being recyclable, which represents a high performing solution that is also sustainable.

In one aspect, the present invention provides a multilayer film comprising at least three layers:

(a) a first layer comprising at least one polyolefin having a density of 0.87 $g/cm^3$ to 0.97 $g/cm^3$, wherein the first layer comprises at least 90 weight percent polyolefin based on the total weight of the first layer, and having an outer surface and an inner surface, wherein the outer surface is an outermost surface of the multilayer film;

(b) a second layer having a first surface and a second surface, the second layer comprising:

(1) at least one polyolefin having a density of 0.87 $g/cm^3$ to 0.97 $g/cm^3$, wherein the second layer comprises at least 90 weight percent polyolefin based on the total weight of the second layer; and (2) from 0.05 weight percent to 5.0 weight percent of at least one polydimethylsiloxane, based on the total weight of the second layer, wherein at least one of the polydimethylsiloxane has a weight average molecular weight, Mw, of from 20,000 g/mol to 700,000 g/mol; and (c) a third layer having a first surface and a second surface, wherein the first surface of the third layer is in adhering contact with the second surface of the second layer, wherein the third layer comprises ethylene vinyl alcohol or polyamide.

As discussed below, the present invention also provides bags and other articles formed from any of the inventive multilayer films disclosed herein.

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

Any reference to the Periodic Table of Elements is that as published by CRC Press, Inc., 1990-1991. Reference to a group of elements in this table is by the new notation for numbering groups.

The term "alkenyl" (or "alkenyl group") refers to an organic radical derived from an aliphatic hydrocarbon by removing one hydrogen atom from an alkene group. A nonlimiting example of an alkenyl group is a vinyl group. A "vinyl group" is a $—CH═CH_2$ group.

"Alkoxy" (or "alkoxy group") refers to the $—OZ^1$ radical, where representative $Z^1$ include alkyl, substituted alkyl, cycloalkyl, substituted cycloalkyl, heterocycloalkyl, substituted heterocycloalkyl, silyl groups and combinations thereof. Nonlimiting examples of suitable alkoxy radicals include methoxy, ethoxy, benzyloxy, and t-butoxy.

The term "alkyl" (or "alkyl group") refers to an organic radical derived from an aliphatic hydrocarbon by removing one hydrogen atom therefrom. An alkyl group may be a linear, branched, cyclic or a combination thereof. The term "substituted alkyl" refers to an alkyl, in which at least one hydrogen atom is substituted with a substituent that comprises at least one heteroatom. Heteroatoms include, but are not limited to, O, N, P and S. Substituents include, but are not limited to, halide, OR', $NR'_2$, $PR'_2$, $P(═O R'_2$, $SiR'_3$; where each R' is independently a $C_1$-$C_{20}$ hydrocarbyl group.

The term "alkynyl" (or "alkynyl group") refers to an organic radical derived from an aliphatic hydrocarbon by removing one hydrogen atom from an alkyne group.

The term "aryl" (or "aryl group") refers to an organic radical derived from aromatic hydrocarbon by removing one hydrogen atom therefrom. An aryl group may be a monocyclic and/or fused ring system, each ring of which suitably contains from 5 to 7, preferably from 5 or 6 atoms. Structures wherein two or more aryl groups are combined through single bond(s) are also included. Specific examples include, but are not limited to, phenyl, tolyl, naphthyl, biphenyl, anthryl, indenyl, fluorenyl, benzofluorenyl, phenanthryl, triphenylenyl, pyrenyl, perylenyl, chrysenyl, naphtacenyl, fluoranthenyl, and the like. The term "substituted aryl" refers to an aryl, in which at least one hydrogen atom is substituted with a substituent comprising at least one heteroatom. Heteroatoms include, but are not limited to, O, N, P and S. Substituents include, but are not limited to, halide OR', $NR'_2$, $PR'_2$, $P(=O)R'_2$, $SiR'_3$; where each R' is independently a $C_1$-$C_{20}$ hydrocarbyl group.

A "cycloalkyl" is a saturated cyclic non-aromatic hydrocarbon radical having a single ring or multiple condensed rings. Nonlimiting examples of suitable cycloalkyl radicals include cyclopentyl, cyclohexyl, cyclooctyl, bicyclooctyl, etc. In particular embodiments, cycloalkyls have between 3 and 200 carbon atoms, between 3 and 50 carbon atoms or between 3 and 20 carbon atoms.

The term "composition," as used herein, refers to a mixture of materials which comprises the composition, as well as reaction products and decomposition products formed from the materials of the composition.

The term "polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or a polymer mixture, including mixtures of polymers that are formed in situ during polymerization.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin," as used herein, refer to a polymer that comprises, in polymerized form, a majority amount of olefin monomer, for example ethylene or propylene (based on the weight of the polymer), and optionally may comprise one or more comonomers.

The term, "ethylene/α-olefin interpolymer," as used herein, refers to an interpolymer that comprises, in polymerized form, a majority amount (>50 mol %) of units derived from ethylene monomer, and the remaining units derived from one or more α-olefins. Typical α-olefins used in forming ethylene/α-olefin interpolymers are $C_3$-$C_{10}$ alkenes.

The term, "ethylene/α-olefin copolymer," as used herein, refers to a copolymer that comprises, in polymerized form, a majority amount (>50 mol %) of ethylene monomer, and an α-olefin, as the only two monomer types.

The term "α-olefin," as used herein, refers to an alkene having a double bond at the primary or alpha (α) position.

"Polyethylene" or "ethylene-based polymer" shall mean polymers comprising a majority amount (>50 mol %) of units which have been derived from ethylene monomer. This includes polyethylene homopolymers, ethylene/α-olefin interpolymers, and ethylene/α-olefin copolymers. Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); High Density Polyethylene (HDPE); Enhanced Polyethylene; polyethylene elastomers; and polyethylene plastomers. These polyethylene materials are generally known in the art; however, the following descriptions may be helpful in understanding the differences between some of these different polyethylene resins. The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 $g/cm^3$.

The term "LLDPE," includes both resin made using the traditional Ziegler-Natta catalyst systems and chromium-based catalyst systems as well as single-site catalysts, including, but not limited to, bis-metallocene catalysts (sometimes referred to as "m-LLDPE"), constrained geometry catalysts (CGC), and molecular catalysts. Resins include linear, substantially linear, or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 $g/cm^3$. "MDPE" is typically made using chromium or Ziegler-Natta catalysts or using single-site catalysts including, but not limited to, bis-metallocene catalysts, constrained geometry catalysts, and molecular catalysts, and typically have a molecular weight distribution ("MWD") greater than 2.5.

The term "HDPE" refers to polyethylenes having densities greater than about 0.935 $g/cm^3$ and up to about 0.970 $g/cm^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 $g/cm^3$, which are generally prepared with Ziegler-Natta catalysts, chrome catalysts, or single-site catalysts including, but not limited to, bis-metallocene catalysts and constrained geometry catalysts.

"Polyethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Polyethylene plastomers/elastomers have a density from 0.870 $g/cm^3$, or 0.880 $g/cm^3$, or 0.890 $g/cm^3$ to 0.900 $g/cm^3$, or 0.902 $g/cm^3$, or 0.904 $g/cm^3$, or 0.909 $g/cm^3$, or 0.910 $g/cm^3$, or 0.912 $g/cm^3$. Nonlimiting examples of polyethylene plastomers/elastomers include AFFINITY™ plastomers and elastomers (available from The Dow Chemical Company), EXACT Plastomers (available from ExxonMobil Chemical), Tafmer (available from Mitsui), Nexlene™ (available from SK Chemicals Co.), and Lucene (available LG Chem Ltd.).

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The term "in adhering contact" and like terms mean that one facial surface of one layer and one facial surface of another layer are in touching and binding contact to one another.

The terms "comprising," "including," "having," and their derivatives, are not intended to exclude the presence of any additional component, step, or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

In some embodiments, a multilayer film of the present invention comprises at least three layers with:

(a) a first layer comprising at least one polyolefin having a density of 0.87 $g/cm^3$ to 0.97 $g/cm^3$, wherein the first layer comprises at least 90 weight percent polyolefin based on the total weight of the first layer, and having an outer surface and an inner surface, wherein the outer surface is an outermost surface of the multilayer film;

(b) a second layer having a first surface and a second surface, the second layer comprising:

(1) at least one polyolefin having a density of 0.87 $g/cm^3$ to 0.97 $g/cm^3$, wherein the second layer comprises at least 90 weight percent polyolefin based on the total weight of the second layer; and (2) from 0.05 weight percent to 5.0 weight percent of at least one polydimethylsiloxane, based on the total weight of the second layer, wherein at least one of the polydimethylsiloxane has a weight average molecular weight, Mw, of from 20,000 g/mol to 700,000 g/mol; and (c) a third layer having a first surface and a second surface, wherein the first surface of the third layer is in adhering contact with the second surface of the second layer, wherein the third layer comprises ethylene vinyl alcohol or polyamide.

In some embodiments, the polyolefin in the first layer is polyethylene that has a melt index ($I_2$) of 0.5 g/10 minutes to 30 g/10 minutes. In some embodiments, the polyolefin in the first layer is polypropylene that has a melt flow rate of 1.0 g/10 minutes to 16.0 g/10 minutes.

In some embodiments, the polyolefin in the second layer is polyethylene that has a melt index ($I_2$) of 0.5 g/10 minutes to 30 g/10 minutes. In some embodiments, the polyolefin in the second layer is polypropylene that has a melt flow rate of 1.0 g/10 minutes to 16.0 g/10 minutes.

In some embodiments, the second layer further comprises maleic anhydride grafted polyolefin or a copolymer comprising ethylene and methacrylic or acrylic acid.

In some embodiments, the first layer further comprises from 0.05 weight percent to 5.0 weight percent of at least one polydimethylsiloxane, based on the total weight of the first layer, wherein at least one of the polydimethylsiloxane has a weight average molecular weight, Mw, of from 20,000 g/mol to 700,000 g/mol. In some embodiments, at least one of the polydimethylsiloxane in the first layer is different from at least one of the polydimethylsiloxane in the second layer.

In some embodiments, the first surface of the second layer is in adhering contact with the inner surface of the first layer.

In some embodiments, the first layer is a sealant layer and comprises a polyethylene having a density of 0.87 $g/cm^3$ to 0.92 $g/cm^3$.

In some embodiments, the multilayer film of the present invention further comprises a fourth layer. In such embodiments, the fourth layer has a first surface and a second surface, wherein the first surface of the fourth layer is in adhering contact with the second surface of the third layer, wherein the fourth layer comprises: (1) at least one polyolefin having a density of 0.87 $g/cm^3$ to 0.97 $g/cm^3$, wherein the fourth layer comprises at least 90 weight percent polyolefin based on the total weight of the fourth layer; and (2) from 0.5 weight percent to 5.0 weight percent of at least one polydimethylsiloxane, based on the total weight of the fourth layer, wherein at least one of the polydimethylsiloxane has a weight average molecular weight, Mw, of from 20,000 g/mol to 700,000 g/mol. In some embodiments, the multilayer film further comprises a fifth layer, wherein the fifth layer has a first surface and a second surface, wherein the first surface of the fifth layer is in adhering contact with the second surface of the fourth layer, wherein the second surface of the fifth layer is an outermost surface of the film, and wherein the fifth layer comprises LLDPE, MDPE, HDPE, or a combination thereof. In such embodiments, the fourth layer can be a tie layer that adheres the fifth layer to the third layer.

In some embodiments, the multilayer film comprises five to eleven layers.

In some embodiments, the thickness of the third layer is 0.5% to 15% of the total thickness of the film. In some embodiments, the film has a total thickness of 1 mil (25.4 microns) to 10 mils (254 microns).

A multilayer film of the present invention can comprise a combination of two or more embodiments as described herein.

Some embodiments of the present invention relate to articles. An article according to embodiments of the present invention comprises a multilayer film according to any of the inventive embodiments disclosed herein. An article of the present invention can comprise a combination of two or more embodiments as described herein.

Some embodiments of the present invention relate to laminates. A laminate according to embodiments of the present invention comprises a multilayer film according to any of the inventive embodiments disclosed herein. For example, a laminate, in some embodiments, comprises a multilayer film adhered to a substrate, wherein the substrate comprises polyethylene terephthalate, polypropylene, polyethylene, polyamide, or combinations thereof. In further embodiments, the substrate of the laminate is polypropylene or polyethylene.

Polydimethylsiloxane

Multilayer films according to the present invention comprise a first layer, a second layer, and a third layer. The second layer comprises 0.05 weight percent to 5.0 weight percent of at least one polydimethylsiloxane, based on the total weight of the second layer, wherein at least one of the polydimethylsiloxane has a weight average molecular weight, Mw, of from 20,000 g/mol to 700,000 g/mol. In some embodiments, the first layer comprises 0.05 weight percent to 5.0 weight percent of at least one polydimethylsiloxane, based on the total weight of the first layer, wherein at least one of the polydimethylsiloxane has a weight average molecular weight, Mw, of from 20,000 g/mol to 700,000 g/mol. Polydimethylsiloxane ("PDMS") is a polymeric organosilicon compound with the following general Structure (I):

Structure (I)

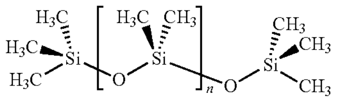

wherein n is the number of repeating monomer $[SiO(CH_3)_2]$ units and n is greater than or equal to 2, or from 2 to 5,500. The PDMS may be unsubstituted or substituted. A "substituted PDMS" is a PDMS in which at least one methyl group of Structure (I) is substituted with a substituent. Nonlimiting examples of substituents include halogen atoms (such as chlorine, fluorine, bromine, and iodine); halogen atom-containing groups (such as chloromethyl groups, perfluorobutyl groups, trifluoroethyl groups, and nonafluorohexyl groups); oxygen atom-containing groups (such as hydroxy groups, alkoxy groups (such as methoxy groups and ethoxy groups), (meth)acrylic epoxy groups, and carboxyl groups); nitrogen atom-containing groups (such as amino-functional groups, amido-functional groups, and cyano-functional groups); sulphur atom-containing groups (such as mercapto groups); hydrogen; $C_2$-$C_{10}$ alkyl groups (such as an ethyl group); $C_2$-$C_{10}$ alkynyl groups; alkenyl groups (such as vinyl groups and hexenyl groups); aryl groups (such as phenyl groups and substituted phenyl groups); cycloalkyl groups (such as cyclohexane groups); and combinations thereof. The substituted methyl group may be a terminal methyl group or a non-terminal methyl group. Nonlimiting examples of suitable substituted PDMS include trialkylsilyl terminated PDMS wherein at least one alkyl is a $C_2$-$C_{10}$ alkyl; dialkylhydroxysilyl terminated PDMS; dialkylhydrogensilyl terminated PDMS; dialkylalkenyl silyl terminated PDMS; and dialkylvinylsilyl terminated PDMS. In an embodiment, the substituted PDMS is a dimethylhydroxysilyl terminated PDMS. In another embodiment, the substituted PDMS is a dimethylvinylsilyl terminated PDMS.

In an embodiment, the substituted PDMS excludes nitrogen atom-containing groups. In another embodiment, the substituted PDMS excludes epoxy substituent groups.

In an embodiment, the PDMS is unsubstituted. An "unsubstituted PDMS" is the PDMS of Structure (I) wherein no methyl group in Structure (I) is substituted with a substituent. In an embodiment, the unsubstituted PDMS is a trimethylsilyl terminated PDMS.

In some embodiments, the PDMS has a viscosity of 1,000 cSt to 2,000,000 cSt.

In an embodiment, the PDMS has a number average molecular weight, Mn, from 30,000 g/mol to 2,000,000 g/mol.

In an embodiment, the PDMS (such as a dimethylhydroxysilyl terminated PDMS) has one, some, or all of the following properties:

(i) a viscosity of 1,000 cSt to 2,000,000 cSt, or 5,000 cSt to 1,500,000 cSt, or 10,000 cSt to 1,000,000 cSt, or 30,000 cSt to 500,000 cSt, or 45,000 cSt to 250,000 cSt, or 50,000 cSt to 200,000 cSt;

(ii) a number average molecular weight, Mn, of a lower limit from 15,000 g/mol, or 25,000 g/mol, or 35,000 g/mol, or 40,000 g/mol, or 45,000 g/mol, or 48,000 g/mol to 49,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, or 290,000 g/mol, or 300,000 g/mol to an upper limit of 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, or 290,000 g/mol, or 300,000 g/mol or 400,000 g/mol; and/or (iii) a weight average molecular weight, Mw, of a lower limit from 20,000 g/mol, 30,000 g/mol, or 40,000 g/mol, or 45,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 120,000 g/mol to 130,000 g/mol, or 140,000 g/mol, or 150,000 g/mol, or 200,000 g/mol, or 250,000 g/mol, or 290,000 g/mol, or 300,000 g/mol to an upper limit of 130,000 g/mol, or 140,000 g/mol, or 150,000 g/mol, or 200,000 g/mol, or 250,000 g/mol, or 290,000 g/mol, or 300,000 g/mol, or 350,000 g/mol, or 400,000 g/mol, or 450,000 g/mol, or 500,000 g/mol, or 550,000 g/mol, or 600,000 g/mol, or 650,000 g/mol, or 700,000 g/mol; and/or (iv) a molecular weight distribution (Mw/Mn) from a lower limit of 1.0, or 1.5, or 2.0, or 2.1, or 2.2, or 2.3, or 2.4 to 2.5, or 2.6, or 2.7, or 2.8, or 2.9, or 3.0, or 3.5 to an upper limit of 1.5, or 2.0, or 2.1, or 2.2, or 2.3, or 2.4 to 2.5, or 2.6, or 2.7, or 2.8, or 2.9, or 3.0, or 3.5; and/or (v) the PDMS has the Structure (I) and n is from a lower limit of 200, or 250, or 300, or 350, or 400, or 450, or 500, or 550, or 600, or 650 to 700, or 750, or 800, or 850, or 900, or 950, or 1000, or 1100, or 1200, or 1300, or 1400, or 1500, or 1600, or 1700, or 1800, or 1900, or 2000, or 2500, or 3000, or 3500, or 4000, or 4054 to an upper limit of 250, or 300, or 350, or 400, or 450, or 500, or 550, or 600, or 650 to 700, or 750, or 800, or 850, or 900, or 950, or 1000, or 1100, or 1200, or 1300, or 1400, or 1500, or 1600, or 1700, or 1800, or 1900, or 2000, or 2500, or 3000, or 3500, or 4000, or 4054, or 5000, or 5500.

The PDMS may comprise two or more embodiments disclosed herein.

As discussed elsewhere, the second layer comprises at least one PDMS. Also, in embodiments where the first layer comprises at least one PDMS, the first layer and second layer may incorporate different PDMS's. In some embodiments, the first layer and second layer use the same PDMS.

First Layer

The multilayer film comprises at least three layers including a first layer. In some embodiments, the multilayer film comprises a first layer comprising at least one polyolefin having a density of 0.87 $g/cm^3$ to 0.97 $g/cm^3$, wherein the first layer comprises at least 90 weight percent polyolefin based on the total weight of the first layer, and having an outer surface and an inner surface, wherein the outer surface is an outermost surface of the multilayer film.

In some embodiments, the first layer is formed from one polyolefin. The first layer, in some embodiments, is formed from a blend of polyolefins providing the specified overall density. The overall density of the first layer formed from a blend of polyolefins is the weighted sum of the densities of the individual polyolefins that make up the first layer.

In some embodiments, the at least one polyolefin of the first layer has a density of 0.87 g/$cm^3$ to 0.97 g/$cm^3$. All individual values and subranges of from 0.87 g/$cm^3$ to 0.97 g/$cm^3$ are disclosed and incorporated herein. For example, the at least one polyolefin of the first layer can have a density with a lower limit of 0.88 g/$cm^3$, 0.89 g/$cm^3$, 0.90 g/$cm^3$, or 0.91 g/$cm^3$ to a density with an upper limit of 0.97 g/$cm^3$, 0.96 g/$cm^3$, 0.95 g/$cm^3$, 0.94 g/$cm^3$, 0.93 g/$cm^3$, or 0.92 g/$cm^3$.

In some embodiments, the first layer comprises at least 90 weight percent polyolefin based on the total weight of the first layer. All individual values and subranges of at least 90 weight percent are disclosed and included herein. For example, the first layer can comprise at least 90 weight percent, 91 weight percent, 92 weight percent, 93 weight percent, 94 weight percent, 95 weight percent, 96 weight percent, 97 weight percent, 98 weight percent, or 99 weight percent polyolefin based on total weight of the first layer.

In some embodiments, the first layer comprises at least 90 weight percent polyethylene based on the total weight of the first layer. All individual values and subranges of at least 90 weight percent are disclosed and included herein. For example, the first layer can comprise at least 90 weight percent, 91 weight percent, 92 weight percent, 93 weight percent, 94 weight percent, 95 weight percent, 96 weight percent, 97 weight percent, 98 weight percent, or 99 weight percent polyethylene based on total weight of the first layer.

In some embodiments, the first layer further comprises from 0.05 weight percent to 5.0 weight percent of at least one polydimethylsiloxane, based on the total weight of the first layer. All individual values and subranges of from 0.05 weight percent to 5.0 weight percent are disclosed and included herein. For example, the first layer can comprise from 0.05 to 5.0 weight percent, from 0.1 to 5.0 weight percent, from 0.5 to 5.0 weight percent, from 1.0 to 5.0 weight percent, or from 1.25 to 5.0 weight percent of at least one polydimethylsiloxane, based on the total weight of the first layer.

In some embodiments, the first layer comprises one polydimethylsiloxane. In some embodiments, the first layer comprises a blend of polydimethylsiloxane (e.g., two, three, or more polydimethylsiloxane). In some embodiments, at least one of the polydimethylsiloxane has a weight average molecular weight, Mw, of from 20,000 g/mol to 700,000 g/mol. All individual values and subranges of 20,000 g/mol to 700,000 g/mol are disclosed and included herein. For example, at least one polydimethylsiloxane of the first layer can have a weight average molecular weight, Mw, of a lower limit from 20,000 g/mol, 30,000 g/mol, or 40,000 g/mol, or 45,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 120,000 g/mol to 130,000 g/mol, or 140,000 g/mol, or 150,000 g/mol, or 200,000 g/mol, or 250,000 g/mol, or 290,000 g/mol, or 300,000 g/mol to an upper limit of 130,000 g/mol, or 140,000 g/mol, or 150,000 g/mol, or 200,000 g/mol, or 250,000 g/mol, or 290,000 g/mol, or 300,000 g/mol, or 350,000 g/mol, or 400,000 g/mol, or 450,000 g/mol, or 500,000 g/mol, or 550,000 g/mol, or 600,000 g/mol, or 650,000 g/mol, or 700,000 g/mol.

For example, in some embodiments, the first layer comprises a polydimethylsiloxane, wherein the polydimethylsiloxane has a weight average molecular weight, Mw, of from 20,000 g/mol to 200,000 g/mol. In some embodiments, the first layer comprises a polydimethylsiloxane wherein the polydimethylsiloxane has a weight average molecular weight, Mw, of from 500,000 g/mol to 700,000 g/mol. In some embodiments, the first layer comprises two polydimethylsiloxane (e.g., a blend of polydimethylsiloxane in a masterbatch formulation), wherein one of the polydimethylsiloxane has a weight average molecular weight, Mw, of from 20,000 g/mol to 200,000 g/mol and another of the polydimethylsiloxane has a weight average molecular weight, Mw, of from 500,000 g/mol to 700,000 g/mol.

In some embodiments, the polyolefin in the first layer is polyethylene that has a melt index ($I_2$) of 0.5 g/10 minutes to 30 g/10 minutes. All individual values of 0.5 g/10 minutes to 30 g/10 minutes are disclosed and included herein. For example, polyethylene in the first layer can have a melt index ($I_2$) of 0.5 g/10 minutes to 30 g/10 minutes, 0.5 g/10 minutes to 20 g/10 minutes, 0.5 g/10 minutes to 10 g/10 minutes, 0.5 g/10 minutes to 5 g/10 minutes, or from 0.5 g/10 minutes to 1 g/10 minutes.

In some embodiments, the first layer comprises LLDPE, MDPE, HDPE, or a combination thereof.

Polyethylenes that are particularly well-suited for use in the first layer of some embodiments of the present invention include, without limitation, low density polyethylene (LDPE), polyethylene plastomer/elastomer, linear low density polyethylene (LLDPE), medium density polyethylene (MDPE), high density polyethylene (HDPE), other ethylene-based polymers (e.g., enhanced polyethylene) having a density from 0.87 g/$cm^3$ to 0.97 g/$cm^3$, olefin block copolymers, and combinations thereof. Various commercially available polyethylenes are contemplated for use as polyolefins in some embodiments of the present invention. Examples of commercially available polyethylene plastomers/elastomers that can be used in embodiments of the present invention include those available from The Dow Chemical Company under the names AFFINITY™ and ENGAGE™, such as AFFINITY™ PL 1880G. Examples of commercially available LDPE that can be used in embodiments of the present invention include those available from The Dow Chemical Company under the names DOW LDPE™ and AGILITY™. Examples of commercially available HDPE and LLDPE that can be used in embodiments of the present invention include those available from The Dow Chemical Company under the name DOWLEX™. Examples of commercially available olefin block copolymers that can be used in embodiments of the present invention include those commercially available from The Dow Chemical Company under the name INFUSE™. Examples of other commercially available HDPEs and ethylene-based polymers having a density from 0.87 to 0.97 g/$cm^3$ that can be used in some embodiments include those available from The Dow Chemical Company under the names ELITE™, ELITE™ AT, and INNATE™. An example of another commercially available HDPE that can be used in some embodiments is DOW™ DMDC 1250 from The Dow Chemical Company.

In some embodiments, the polyolefin in the first layer is polypropylene that has a density of 0.865 g/$cm^3$ to 0.905 g/$cm^3$ and/or a melt flow rate of 1.0 g/10 minutes to 16.0 g/10 minutes. All individual values and subranges of a density of from 0.865 g/$cm^3$ to 0.905 g/$cm^3$ are disclosed and included herein. For example, polypropylene of the first layer can have a density of from 0.865 g/cm$^3$ to 0.900 g/cm$^3$, 0.870 g/cm$^3$ to 0.895 g/cm$^3$, 0.870 g/cm$^3$ to 0.900 g/cm$^3$, 0.875 g/cm$^3$ to 0.900 g/cm$^3$, or 0.875 g/cm$^3$ to 0.885 g/cm$^3$. All individual values and subranges of a melt flow rate of 1.0 g/10 minutes to 16.0 g/10 minutes are disclosed and included herein. For example, polypropylene of the first layer can have a melt flow rate of 1.0 g/10 minutes to 15.0 g/10 minutes, 2.0 g/10 minutes to 13.0 g/10 minutes, 3.0 g/10 minutes to 11.0 g/10 minutes, 1.0 g/10 minutes to 8.0 g/10 minutes, 2.0 g/10 minutes to 7.0 g/10 minutes, 2.0 g/10 minutes to 6.0 g/10 minutes, 2.0 g/10 minutes to 5.0 g/10 minutes, 3.0 g/10 minutes to 9.0 g/10 minutes, or 4.0 g/10 minutes to 9.0 g/10 minutes.

In some embodiments, the first layer is a sealant layer and comprises a polyethylene having a density of 0.87 g/cm$^3$ to 0.92 g/cm$^3$. In some embodiments, the sealant layer can comprise any polyethylene resins known to those having ordinary skill in the art to be useful as a sealant layer. The sealant layer, in some embodiments, may comprise one or more ethylene-based polymers having a density from 0.870 to 0.925 g/cm$^3$ and a melt index (12) from 0.1 to 2.0 g/10 min. In further embodiments, the ethylene-based polymer of the sealant film (or sealant layer) may have a density from 870 to 0.925 g/cm$^3$, or from 0.900 to 0.925 g/cm$^3$, or 0.910 to 0.925 g/cm$^3$. Additionally, the ethylene-based polymer of the sealant film (or sealant layer) may have a melt index (12) from 0.1 to 2.0 g/10 min, or from 0.1 to 1.5 g/10 min. Various commercial polyethylenes are considered suitable for the sealant layer. Suitable commercial examples may include ELITE™ 5400G, ELITE™ 5401B, and various AFFINITY™ polyolefin plastomers (e.g., AFFINITY™ PL 1888, AFFINITY™ PF 1140, and AFFINITY™ PF 1146, AFFINITY™ VP 8770G1), each of which are available from The Dow Chemical Company (Midland, MI).

Second Layer

The multilayer film comprises at least three layers including a second layer. In some embodiments, the second layer comprises (1) at least one polyolefin having a density of 0.87 g/cm$^3$ to 0.97 g/cm$^3$, wherein the second layer comprises at least 90 weight percent polyolefin based on the total weight of the second layer; and (2) from 0.05 weight percent to 5.0 weight percent of at least one polydimethylsiloxane, based on the total weight of the second layer, wherein at least one of the polydimethylsiloxane has a weight average molecular weight, Mw, of from 20,000 g/mol to 700,000 g/mol.

In some embodiments, the second layer is formed from one polyolefin. The second layer, in some embodiments, is formed from a blend of polyolefins providing the specified overall density. The overall density of the second layer formed from a blend of polyolefins is the weighted sum of the densities of the individual polyolefins that make up the layer.

In some embodiment, the at least one polyolefin of the second layer has a density of 0.87 g/cm$^3$ to 0.97 g/cm$^3$. All individual values and subranges of from 0.87 g/cm$^3$ to 0.97 g/cm$^3$ are disclosed and incorporated herein. For example, the at least one polyolefin of the second layer can have a density with a lower limit of 0.88 g/cm$^3$, 0.89 g/cm$^3$, 0.90 g/cm$^3$, or 0.91 g/cm$^3$ to a density with an upper limit of 0.97 g/cm$^3$, 0.96 g/cm$^3$, 0.95 g/cm$^3$, 0.94 g/cm$^3$, 0.93 g/cm$^3$, or 0.92 g/cm$^3$.

In some embodiments, the second layer comprises at least 90 weight percent polyolefin based on the total weight of the second layer. All individual values and subranges of at least 90 weight percent are disclosed and included herein. For example, the second layer can comprise at least 90 weight percent, 91 weight percent, 92 weight percent, 93 weight percent, 94 weight percent, 95 weight percent, 96 weight percent, 97 weight percent, 98 weight percent, or 99 weight percent polyolefin based on total weight of the second layer.

In some embodiments, the second layer further comprises from 0.05 weight percent to 5.0 weight percent of at least one polydimethylsiloxane, based on the total weight of the second layer. All individual values and subranges of from 0.05 weight percent to 5.0 weight percent are disclosed and included herein. For example, the second layer can comprise from 0.05 to 5.0 weight percent, from 0.1 to 5.0 weight percent, from 0.5 to 5.0 weight percent, from 1.0 to 5.0 weight percent, or from 1.25 to 5.0 weight percent of at least one polydimethylsiloxane, based on the total weight of the second layer.

In some embodiments, the second layer comprises one polydimethylsiloxane. In some embodiments, the second layer comprises a blend of polydimethylsiloxane (e.g., two, three, or more polydimethylsiloxane). In some embodiments, at least one of the polydimethylsiloxane has a weight average molecular weight, Mw, of from 20,000 g/mol to 700,000 g/mol. All individual values and subranges of 20,000 g/mol to 700,000 g/mol are disclosed and included herein. For example, at least one polydimethylsiloxane of the second layer can have a weight average molecular weight, Mw, of a lower limit from 20,000 g/mol, 30,000 g/mol, or 40,000 g/mol, or 45,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 120,000 g/mol to 130,000 g/mol, or 140,000 g/mol, or 150,000 g/mol, or 200,000 g/mol, or 250,000 g/mol, or 290,000 g/mol, or 300,000 g/mol to an upper limit of 130,000 g/mol, or 140,000 g/mol, or 150,000 g/mol, or 200,000 g/mol, or 250,000 g/mol, or 290,000 g/mol, or 300,000 g/mol, or 350,000 g/mol, or 400,000 g/mol, or 450,000 g/mol, or 500,000 g/mol, or 550,000 g/mol, or 600,000 g/mol, or 650,000 g/mol, or 700,000 g/mol.

For example, in some embodiments, the second layer comprises a polydimethylsiloxane, wherein the polydimethylsiloxane has a weight average molecular weight, Mw, of from 20,000 g/mol to 200,000 g/mol. In some embodiments, the second layer comprises a polydimethylsiloxane wherein the polydimethylsiloxane has a weight average molecular weight, Mw, of from 500,000 g/mol to 700,000 g/mol. In some embodiments, the second layer comprises two polydimethylsiloxane (e.g., a blend of polydimethylsiloxane in a masterbatch formulation), wherein one of the polydimethylsiloxane has a weight average molecular weight, Mw, of from 20,000 g/mol to 200,000 g/mol and another of the polydimethylsiloxane has a weight average molecular weight, Mw, of from 500,000 g/mol to 700,000 g/mol.

In some embodiments, at least one of the polydimethylsiloxane in the second layer is different from any polydimethylsiloxane in the first layer.

In some embodiments, the polyolefin in the second layer is polyethylene that has a melt index ($I_2$) of 0.5 g/10 minutes to 30 g/10 minutes. All individual values of 0.5 g/10 minutes to 30 g/10 minutes are disclosed and included herein. For example, polyethylene in the second layer can have a melt index (12) of 0.5 g/10 minutes to 30 g/10 minutes, 0.5 g/10 minutes to 20 g/10 minutes, 0.5 g/10 minutes to 10 g/10 minutes, 0.5 g/10 minutes to 5 g/10 minutes, or from 0.5 g/10 minutes to 1 g/10 minutes.

In some embodiments, the second layer comprises LLDPE, MDPE, HDPE, or a combination thereof.

Polyethylenes that are particularly well-suited for use in the core layer of some embodiments of the present invention include, without limitation, low density polyethylene (LDPE), polyethylene plastomer/elastomer, linear low density polyethylene (LLDPE), medium density polyethylene (MDPE), high density polyethylene (HDPE), other ethylene-based polymers (e.g., enhanced polyethylene) having a density from 0.87 g/cm$^3$ to 0.97 g/cm$^3$, olefin block copolymers, and combinations thereof. Various commercially available polyethylenes are contemplated for use in some embodiments of the present invention. Examples of commercially available polyethylene plastomers/elastomers that can be used in embodiments of the present invention include those available from The Dow Chemical Company under the names AFFINITY™ and ENGAGE™, such as AFFINITY™ PL 1880G. Examples of commercially available LDPE that can be used in embodiments of the present invention include those available from The Dow Chemical Company under the names DOW LDPE™ and AGILITY™. Examples of commercially available HDPE and LLDPE that can be used in embodiments of the present invention include DOWLEX™ commercially available from The Dow Chemical Company. Examples of commercially available olefin block copolymers that can be used in embodiments of the present invention include those commercially available from The Dow Chemical Company under the name INFUSE™. Examples of other commercially available HDPEs and ethylene-based polymers having a density from 0.87 to 0.97 g/cm$^3$ that can be used in some embodiments include those available from The Dow Chemical Company under the names ELITE™, ELITE™ AT, and INNATE™. An example of another commercially available HDPE that can be used in some embodiments is DOW™ DMDC 1250 from The Dow Chemical Company.

In some embodiments, the polyolefin in the second layer is polypropylene that has a density of 0.865 g/cm$^3$ to 0.905 g/cm$^3$ and/or a melt flow rate of 1.0 g/10 minutes to 16.0 g/10 minutes. All individual values and subranges of a density of from 0.865 g/cm$^3$ to 0.905 g/cm$^3$ are disclosed and included herein. For example, polypropylene of the second layer can have a density of from 0.865 g/cm$^3$ to 0.900 g/cm$^3$, 0.870 g/cm$^3$ to 0.895 g/cm$^3$, 0.870 g/cm$^3$ to 0.900 g/cm$^3$, 0.875 g/cm$^3$ to 0.900 g/cm$^3$, or 0.875 g/cm$^3$ to 0.885 g/cm$^3$. All individual values and subranges of a melt flow rate of 1.0 g/10 minutes to 16.0 g/10 minutes are disclosed and included herein. For example, polypropylene of the second layer can have a melt flow rate of 1.0 g/10 minutes to 15.0 g/10 minutes, 2.0 g/10 minutes to 13.0 g/10 minutes, 3.0 g/10 minutes to 11.0 g/10 minutes, 1.0 g/10 minutes to 8.0 g/10 minutes, 2.0 g/10 minutes to 7.0 g/10 minutes, 2.0 g/10 minutes to 6.0 g/10 minutes, 2.0 g/10 minutes to 5.0 g/10 minutes, 3.0 g/10 minutes to 9.0 g/10 minutes, or 4.0 g/10 minutes to 9.0 g/10 minutes.

In some embodiments, the thickness of the second layer is 5% to 90% of the thickness of the multilayer film. All individual values and subranges of 5% to 90% are included and disclosed herein. For example, the thickness of the second layer can be 5% to 90%, 10% to 80%, 20% to 70%, 30% to 70%, or 35% to 65% of the thickness of the multilayer film.

In some embodiments, the second layer has a first surface and a second surface, wherein the first surface of the second layer is in adhering contact with the inner surface of the first layer.

In some embodiments, the second layer is a tie layer. In some such embodiments, the second layer further comprises a maleic anhydride grafted polyolefin or a copolymer comprising ethylene and methacrylic or acrylic acid. For example, in some embodiments, the second layer further comprises a maleic anhydride grafted polyethylene. In some embodiments, the second layer further comprises a maleic anhydride grafted linear low density polyethylene. In such embodiments, the maleic anhydride grafted linear low density polyethylene can have a density in the range of from 0.860 g/cm$^3$ to 0.935 g/cm$^3$. All individual values and subranges of from 0.860 g/cm$^3$ to 0.935 g/cm$^3$ are disclosed and included herein; for example, the maleic anhydride grafted linear low density polyethylene can have a density in the range of from 0.875 g/cm$^3$ to 0.935 g/cm$^3$, 0.900 g/cm$^3$ to 0.925 g/cm$^3$, 0.910 g/cm$^3$ to 0.935 g/cm$^3$, 0.910 g/cm$^3$ to 0.925 g/cm$^3$, 0.915 g/cm$^3$ to 0.935 g/cm$^3$, or 0.920 g/cm$^3$ to 0.930 g/cm$^3$. In some embodiments, the maleic anhydride grafted linear low density polyethylene has a melt index (12) from 0.1 g/10 min to 50 g/10 min, or from 0.5 g/10 min to 20 g/10 min, or from 1.0 g/10 min to 10 g/10 min.

Examples of commercially available maleic anhydride grafted polyolefins that can be used in some embodiments of the present invention include those available from The Dow Chemical Company under the name BYNEL™, including, for example, BYNEL™ 41E710. Examples of commercially available ethylene methacrylic acid copolymers that can be used in some embodiments of the present invention include those available from The Dow Chemical Company under the name NUCREL™. Examples of commercially available ethylene acrylic acid copolymers that can be used in some embodiments of the present invention include those available from SK Global Chemical Co. Ltd. under the name PRIMACOR™

Third Layer

The multilayer film comprises at least three layers including a third layer. The third layer has a first surface and a second surface, wherein the first surface of the third layer is in adhering contact with the second surface of the second layer, wherein the third layer comprises ethylene vinyl alcohol or polyamide.

In some embodiments, the third layer is a barrier layer. In some embodiments where the third layer comprises ethylene vinyl alcohol, the ethylene vinyl alcohol has an ethylene content of from 20 to 50 mol %. All subranges and individual values of an ethylene content of from 20 to 50 mol % are disclosed and included herein. For example, in embodiments, the ethylene vinyl alcohol of the third layer has an ethylene content of from 20 to 50 mol %, or 22 to 45 mol %, or 25 to 40 mol %. A person of ordinary skill in the art will appreciate that the ethylene content of the ethylene vinyl alcohol can contribute to lower or raise the OTR of the multilayer film disclosed herein (i.e., in general, the lower the ethylene content, the lower the achievable OTR value is). A person of ordinary skill in the art will also appreciate that a third layer comprising ethylene vinyl alcohol with lower ethylene content may be suitable for flexible bottle and tube applications and a third layer comprising an ethylene vinyl alcohol with higher ethylene content may allow for easier processing, long-term run stability, and packaging types requiring flexibility (flex crack resistance), such as, thermoformability.

Commercially available examples of ethylene vinyl alcohol that can be used in the third layer include those commercially available from Kuraray Co., Ltd. (Tokyo, Japan) under the name EVAL, including, for example, EVAL H171B (38 mol % ethylene content), and EVAL F171B (32 mol % ethylene content).

In some embodiments, the third layer comprises polyamide. The term "polyamide' means a polymer having amide linkages, and as used herein it refers more specifically to synthetic polyamides, either aliphatic or aromatic, either in crystalline or amorphous form. It is intended to refer to both polyamides and co-polyamides. Polyamides are preferably selected from compounds approved for use in producing articles intended for use in processing, handling, and packaging food, including homopolymers, copolymers and mixtures of the polyamide materials described in 21 C.F.R. 177.1500 et seq., which is incorporated herein by reference. Examples of polyamides that can be used in some embodiments of the present invention include those commercially available from BASF under the names Ultramid C40L or Ultramid B40L and those commercially available from UBE under the names UBE 5033, UBE 1030, or UBE 6434.

In some embodiments, the thickness of the third layer is 0.5% to 15% of the total thickness of the film. All individual values and subranges of 0.5% to 15% are disclosed and included herein. For example, the thickness of the third layer can be 0.5% to 12%, 2.5% to 10%, or 4% to 8% of the total thickness of the film.

Other Layers

The multilayer film comprises at least three layers. In some embodiments, the multilayer film comprises five to eleven layers. In some embodiments, the multilayer film further comprises a fourth layer, wherein the fourth layer has a first surface and a second surface, wherein the first surface of the fourth layer is in adhering contact with the second surface of the third layer, wherein the fourth layer comprises: (1) at least one polyolefin having a density of 0.87 g/cm$^3$ to 0.97 g/cm$^3$, wherein the fourth layer comprises at least 90 weight percent polyolefin based on the total weight of the fourth layer; and (2) from 0.5 weight percent to 5.0 weight percent of at least one polydimethylsiloxane, based on the total weight of the fourth layer, wherein the polydimethylsiloxane has a viscosity of 1,000 cSt to 2,000,000 cSt.

In some embodiment, the at least one polyolefin of the fourth layer has a density of 0.87 g/cm$^3$ to 0.97 g/cm$^3$. All individual values and subranges of from 0.87 g/cm$^3$ to 0.97 g/cm$^3$ are disclosed and incorporated herein. For example, the at least one polyolefin of the fourth layer can have a density with a lower limit of 0.88 g/cm$^3$, 0.89 g/cm$^3$, 0.90 g/cm$^3$, or 0.91 g/cm$^3$ to a density with an upper limit of 0.97 g/cm$^3$, 0.96 g/cm$^3$, 0.95 g/cm$^3$, 0.94 g/cm$^3$, 0.93 g/cm$^3$, or 0.92 g/cm$^3$.

In some embodiments, the fourth layer comprises at least 90 weight percent polyolefin based on the total weight of the fourth layer. All individual values and subranges of at least 90 weight percent are disclosed and included herein. For example, the fourth layer can comprise at least 90 weight percent, 91 weight percent, 92 weight percent, 93 weight percent, 94 weight percent, 95 weight percent, 96 weight percent, 97 weight percent, 98 weight percent, or 99 weight percent polyolefin based on total weight of the fourth layer.

In some embodiments, the fourth layer further comprises from 0.05 weight percent to 5.0 weight percent of at least one polydimethylsiloxane, based on the total weight of the fourth layer. All individual values and subranges of from 0.05 weight percent to 5.0 weight percent are disclosed and included herein. For example, the fourth layer can comprise from 0.05 to 5.0 weight percent, from 0.1 to 5.0 weight percent, from 0.5 to 5.0 weight percent, from 1.0 to 5.0 weight percent, or from 1.25 to 5.0 weight percent of at least one polydimethylsiloxane, based on the total weight of the fourth layer.

In some embodiments, the fourth layer is a tie layer.

In some embodiments, the fourth layer comprises one polydimethylsiloxane. In some embodiments, the fourth layer comprises a blend of polydimethylsiloxane (e.g., two, three, or more polydimethylsiloxane). In some embodiments, at least one of the polydimethylsiloxane has a weight average molecular weight, Mw, of from 20,000 g/mol to 700,000 g/mol. All individual values and subranges of 20,000 g/mol to 700,000 g/mol are disclosed and included herein. For example, at least one polydimethylsiloxane of the fourth layer can have a weight average molecular weight, Mw, of a lower limit from 20,000 g/mol, 30,000 g/mol, or 40,000 g/mol, or 45,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 120,000 g/mol to 130,000 g/mol, or 140,000 g/mol, or 150,000 g/mol, or 200,000 g/mol, or 250,000 g/mol, or 290,000 g/mol, or 300,000 g/mol to an upper limit of 130,000 g/mol, or 140,000 g/mol, or 150,000 g/mol, or 200,000 g/mol, or 250,000 g/mol, or 290,000 g/mol, or 300,000 g/mol, or 350,000 g/mol, or 400,000 g/mol, or 450,000 g/mol, or 500,000 g/mol, or 550,000 g/mol, or 600,000 g/mol, or 650,000 g/mol, or 700,000 g/mol.

In some embodiments, the multilayer film further comprises a fifth layer, wherein the fifth layer has a first surface and a second surface, wherein the first surface of the fifth layer is in adhering contact with the second surface of the fourth layer, wherein the second surface of the fifth layer is an outermost surface of the film, and wherein the fifth layer comprises polypropylene, LLDPE, MDPE, HDPE, or a combination thereof.

In some embodiments, the multilayer film has a total thickness of 1 mil (25.4 microns) to 10 mils (254 microns). All individual values and subranges of 1 mil (25.4 microns) to 10 mils (254 microns) are disclosed and incorporated herein. For example, the multilayer film can have a total thickness of 1 mil to 10 mil, 2 mil to 8 mil, 3 mil to 7 mil, or 4 mil to 6 mil.

Multilayer films of the present invention exhibit one or more desirable properties. For example, in some embodiments, multilayer films can exhibit desirable Gelbo flex crack performance. Such properties are particularly advantageous in a film that is highly recyclable (e.g., greater than 90% by weight polyethylene). In some embodiments, the multilayer film comprises greater than 90 wt %, based on total weight of the film, polyethylene. In other embodiments, the multilayer film comprises greater than 90 wt. %, based on total weight of the film, polypropylene.

In some embodiments, a multilayer film of the present invention exhibits a Gelbo flex crack performance of 0.05 pinholes or less in 1,000 cycles. In some embodiments, a multilayer film of the present invention exhibits a Gelbo flex crack performance of 1.5 pinholes or less in 3,000 cycles. In some embodiments, a multilayer film of the present invention exhibits a Gelbo flex crack performance of 1 pinhole or less in 6,000 cycles.

Multilayer films can be coextruded as blown films or cast films using techniques known to those of skill in the art based on the teachings herein. In particular, based on the compositions of the different film layers disclosed herein, blown film manufacturing lines or cast film manufacturing lines can be configured to coextrude multilayer films of the present invention in a single extrusion step using techniques known to those of skill in the art based on the teachings herein. In some embodiments, the multilayer films are coextruded blown films.

Optional Additives

In some embodiments, one or more layers of the multilayer film include one or more optional additives. Nonlimiting examples of suitable additives include antiblock agents, antioxidants, antistatic agents, stabilizing agents, nucleating agents, colorants, pigments, ultra violet (UV) absorbers or stabilizers, flame retardants, compatibilizers, plasticizers, fillers, processing aids, antifog additive, cross-linking agents (e.g., peroxides), and combinations thereof.

In some embodiments, the first layer includes an antiblock agent. An "antiblock agent" is a compound that minimizes, or prevents, blocking (i.e., adhesion) between two adjacent layers of film by creating a microscopic roughening of the film layer surface, which reduces the available contact area between adjacent layers. The antiblock agent may be organic or inorganic. Nonlimiting examples of suitable antiblock agents include silica, talc, calcium carbonate, and combinations thereof. In an embodiment, the antiblock agent is silica ($SiO_2$). The silica may be organic silica or synthetic silica. In another embodiment, the antiblock agent is talc.

In some embodiments, one or more layers of the multilayer film can each contain from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % total additives, based on the total weight of the layer.

Laminates

Embodiments of the present invention also comprise laminates incorporating the multilayer film of the present invention. In some embodiments, a laminate comprises a multilayer film according to embodiments disclosed herein adhered to a substrate, wherein the substrate comprises polyethylene terephthalate, polypropylene, polyethylene, or polyamide. In some embodiments, a laminate comprises a multilayer film according to embodiments disclosed herein adhered to a substrate, wherein the substrate comprises polypropylene or polyethylene.

Laminates according to embodiments of the present invention can be formed using techniques known to those having ordinary skill in the art based on the teachings herein. For example, an inventive multilayer film can be laminated to the other film using an adhesive. Various adhesive compositions are considered suitable for the adhesives used to make a laminate. These may include polyurethane, epoxy, acrylic, or the like. In one embodiment, the laminate may comprise adhesive layers comprising polyurethane adhesive. The polyurethane adhesive may be solventless, waterborne or solvent based. Furthermore, the polyurethane adhesive may be a two part formulation. The weight or thickness of the adhesive layer can depend on a number of factors including, for example, the desired thickness of the multilayer structure, the type of adhesive used, and other factors. In some embodiments, an adhesive layer is applied at up to 5.0 grams/$m^2$, or from 1.0 to 4.0 g/$m^2$, or from 2.0 to 3.0 g/$m^2$.

Articles

Embodiments of the present invention also comprise articles, such as packages, formed from or incorporating multilayer films of the present invention. Such packages can be formed from any of the inventive multilayer films described herein.

Examples of such articles can include flexible packages, pouches, stand-up pouches, and pre-made packages or pouches. In some embodiments, multilayer films or laminates of the present invention can be used for food packages. Examples of food that can be included in such packages include meats, cheeses, cereal, nuts, juices, sauces, and others. Such packages can be formed using techniques known to those of skill in the art based on the teachings herein and based on the particular use for the package (e.g., type of food, amount of food, etc.).

One example of an article that can be formed from any of the inventive multilayer films described herein is a large bag. In some embodiments, such bags have a volume of at least 250 gallons. Such bags, in some embodiments, have a volume up to about 6,000 gallons. In some embodiments, such bags can be used in bag-in-box flexible liquid packages ("BIB packages"). Such bags can be used for a wide variety of liquids.

Test Methods

Unless otherwise indicated herein, the following analytical methods are used in describing aspects of the present invention:

Melt Index and Melt Flow Rate

Melt indices $I_2$ (or 12) and $I_{10}$ (or 110) are measured in accordance to ASTM D-1238 (method B) at 190° C. and at 2.16 kg and 10 kg load, respectively. Their values are reported in g/10 min. Melt flow rate (MFR) is used for polypropylene homopolymers and propylene-ethylene interpolymers and is measured in accordance with ASTM D-1238 at 230° C. at 2.16 kg.

Density

Samples for density measurement are prepared according to ASTM D4703.

Measurements are made, according to ASTM D792, Method B, within one hour of sample pressing.

GPC-Triple Detector (PDMS Mw and Mn Measurement)

Weight average molecular weight (Mw) and number average molecular weight (Mn) of the polydimethylsiloxane are measured by GPC (Viscotek™ GPC Max) using a triple detection capability. The Viscotek™ TDA305 unit is equipped with a differential refractometer, an online differential pressure viscometer, and low angle light scattering (LALS: 7° and 90° angles of detection). The mobile phase is Toluene HPLC grade. The columns are two PL Gel Mixed C from Varian—(7.5*300 mm, 5 μm particle size) and a PL Gel Guard column from Varian—(7.5*300 mm) 5 fractom Injection volume with a flow of 1 mL/min and a run time of 37 min. The column and detector temperature is 40° C. The software used is Omnisec 4.6.1 (Viscotek™).

The detectors are calibrated by injection of a narrow polystyrene standard (Mw 68,100 g/mol) of a known concentration. Correct run parameters are checked by using a narrow molecular weight distribution polystyrene standard (PS71K). The molecular weight averages must be within the Statistical Process Control (SPC) chart in order to validate the detectors calibration. Typical $GPC^3$ precision and accuracy (which depends on the refractive index increment) are around 2-3%.

Gelbo Flex Crack Performance

The Gelbo flex crack performance is measured using a Gelbo flex tester set up to test in accordance with ASTM F392.

Some embodiments of the invention will now be described in detail in the following Examples.

Examples

The raw materials shown in Table 1 are used to prepare the Inventive Films and Comparative Films discussed below. Each of the resins are commercially available from The Dow Chemical Company unless noted otherwise.

TABLE 1

| Commercial Name | Type | $I_2$ (g/10 min) | Density (g/cc) |
|---|---|---|---|
| AFFINITY ™ PL 1880G | Polyethylene Plastomer | 1.0 | 0.902 |
| ENGAGE ™ 8180 | Polyolefin Elastomer | 0.5 | 0.863 |
| INNATE ™ ST50 | Polyethylene | 0.85 | 0.918 |
| INNATE ™ TH60 | Polyethylene | 0.85 | 0.912 |
| BYNEL ™ 41E710 | Maleic Anhydride Grafted LLDPE | 2.7 | 0.922 |
| DOWLEX ™ 2045 | LLDPE | 1.0 | 0.920 |
| Eval F171B* | Ethylene Vinyl Alcohol (32% mol) | N/A | N/A |
| PDMS** | PDMS Gum Mn = 336,000 g/mol<br>PDMS Gum Mw = 628,000 g/mol<br>PDMS Fluid 60,000 cSt<br>PDMS Fluid Mn = 61,000 g/mol<br>PDMS Fluid Mw = 121,000 g/mol | N/A | N/A |

*Commercially available from Kuraray America, Inc.

**To produce the PDMS formulation, a linear low density polyethylene (DOWLEX ™ 2047G) is blended with polydimethylsiloxane (PDMS) in a co-rotating twin screw extruder (TSE). A 26 mm Coperion co-rotating twin screw extruder with L/D of 60 is used to melt mix and disperse the PDMS into the linear low density polyethylene matrix. Specifically, polyethylene pellets are fed into a feed hopper of the TSE hopper using a K-Tron gravimetric feeder. Gum PDMS (4-7034 PDMS gum) is injected into the TSE at an L/D of 18 using a combination of Bonnet feeder and Maag gear pump. Fluid PDMS (PMX-200, 60,000 cSt) is injected into the TSE at an L/D of 34 using a Zenith gear pump. The TSE barrels are set at 180° C. and the screw speed is 300 rpm. The polyethylene pellets are fed at a rate of 26 lb/h, the PDMS gum is fed at a rate of 10.5 lb/h and the PDMS fluid is injected at a rate of 3.5 lb/h. The total throughput rate is 40 lb/h. The final PDMS polymer melt is pelletized using a Gala underwater pelletizer to result in a pellet size corresponding to 32 pellets/gm.

Inventive Films 1-2 and Comparative Films A-D

Inventive Films 1-2 and Comparative Films A-D are five layer (A/B/C/B/A) coextruded films that are prepared as follows. Inventive Films 1-2 and Comparative Films A-D have the following structures:

TABLE 2

| Film | Structure* | Layer Ratio (A/B/C/B/A) |
|---|---|---|
| Inv. Film 1 | A: 98.5% AFFINITY ™ PL 1880G + 1.5% PDMS<br>B: 83.5% INNATE ™ ST50 + 15% BYNEL ™ 41E710 + 1.5% PDMS<br>C: 100% Eval F171B | 20%//25%//10%//25%//20% |
| Inv. Film 2 | A: 98.5% INNATE ™ ST50 + 1.5% PDMS<br>B: 83.5% AFFINITY ™ PL 1880G + 15% BYNEL ™ 41E710 + 1.5% PDMS<br>C: 100% Eval F171B | 25%//20%//10%//20%//25% |
| Comp. Film A | A: 100% AFFINITY ™ PL 1880G<br>B: 85% INNATE ™ ST50 + 15% BYNEL ™<br>C: 100% Eval F171B | 20%//25%//10%//25%//20% |
| Comp. Film B | A: 100% INNATE ™ ST50<br>B: 85% INNATE ™ ST50 + 15% BYNEL ™<br>C: 100% Eval F171B | 25%//20%//10%//20%//25% |
| Comp. Film C | A: 100% DOWLEX ™ 2450<br>B: 85% DOWLEX ™ 2450 + 15% BYNEL ™<br>C: 100% Eval F171B | 20%//25%//10%//25%//20% |
| Comp. Film D | A: 100% INNATE ™ TH60<br>B: 85% INNATE ™ TH60 + 15% BYNEL ™<br>C: 100% Eval F171B | 20%//25%//10%//25%//20% |

*Each multilayer film includes 3000 pm of talc in all layers.

The films are produced using a LabTech coextrusion blown film line. The line was comprised of five 30:1 L/D single screw extruders, equipped with smooth feed zones. Screw diameters are 25 mm for the two outer layer extruders and 20 mm for the three core layer extruders. The die is 74.9 mm, and the die gap is 2 mm. The melt temperature is 430° F. The blow-up ratio is 2.5:1. The output rate is 20 pounds/hour/inch. The nominal thickness of each film is 2 mils.

The Gelbo flex crack performance is measured using the test method described above (Gelbo flex crack performance is reported as "Defects"). Gelbo flex crack performance is measured after 1,000 (1k) cycles, after 3,000 (3k) cycles, and after 6,000 (6k) cycles. The results are shown in Table 3.

TABLE 3

| Film | Defects after 1 k Gelbo cycles | Defects after 3 k Gelbo cycles | Defects after 6 k Gelbo cycles |
|---|---|---|---|
| Inventive Film 1 | 0 | 0 | 0 |
| Inventive Film 2 | 0 | 1 | 0.7 |
| Comparative Film A | 0.05 | 2.3 | 10.3 |
| Comparative Film B | 0.05 | 3 | 7 |
| Comparative Film C | 0.33 | 5.7 | 19 |
| Comparative Film D | 0.33 | 2 | 5.3 |

Inventive Films 1 and 2 have excellent Gelbo flex crack performance in comparison to Comparative Films A-D. When comparing Comparative Films A-D to the Inventive Films, Inventive Films 1 and 2 demonstrate that the inclusion of PDMS in the film surprisingly improves Gelbo flex crack performance.

That which is claimed:

1. A multilayer film comprising at least three layers:

(a) a first layer comprising at least one polyolefin having a density of 0.87 $g/cm^3$ to 0.97 $g/cm^3$, wherein the first layer comprises at least 90 weight percent polyolefin based on the total weight of the first layer, and having an outer surface and an inner surface, wherein the outer surface is an outermost surface of the multilayer film;

(b) a second layer having a first surface and a second surface, the second layer comprising:

(1) at least one polyolefin having a density of 0.87 $g/cm^3$ to 0.97 $g/cm^3$, wherein the second layer comprises at least 90 weight percent polyolefin based on the total weight of the second layer; and (2) from 0.05 weight percent to 5.0 weight percent of at least one polydimethylsiloxane, based on the total weight of the second layer, wherein at least one of the polydimethylsiloxane has a weight average molecular weight, Mw, of from 20,000 g/mol to 700,000 g/mol; and (c) a third layer, wherein the third layer has a first surface and a second surface, wherein the first surface of the third layer is in adhering contact with the second surface of the second layer, wherein the third layer comprises ethylene vinyl alcohol or polyamide.

2. The multilayer film of claim 1, wherein the polyolefin in the first layer is polyethylene that has a melt index ($I_2$) of 0.5 g/10 minutes to 30 g/10 minutes.

3. The multilayer film of claim 1, wherein the polyolefin in the first layer is polypropylene that has a melt flow rate of 1.0 g/10 minutes to 16.0 g/10 minutes.

4. The multilayer film of claim 1, wherein the polyolefin in the second layer is polyethylene that has a melt index ($I_2$) of 0.5 g/10 minutes to 30 g/10 minutes.

5. The multilayer film of claim 1, wherein the second layer further comprises a maleic anhydride grafted polyolefin or a copolymer comprising ethylene and methacrylic or acrylic acid.

6. The multilayer film of claim 1, wherein the first layer further comprises from 0.05 weight percent to 5.0 weight percent of at least one polydimethylsiloxane, based on the total weight of the first layer, wherein at least one of the polydimethylsiloxane has a weight average molecular weight, Mw, of from 20,000 g/mol to 700,000 g/mol.

7. The multilayer film of claim 6, wherein at least one of the polydimethylsiloxane in the first layer is different from at least one of the polydimethylsiloxane in the second layer.

8. The multilayer film of claim 1, wherein the first surface of the second layer is in adhering contact with the inner surface of the first layer.

9. The multilayer film of claim 1, wherein the first layer is a sealant layer and comprises a polyethylene having a density of 0.87 $g/cm^3$ to 0.92 $g/cm^3$.

10. The multilayer film of claim 1 further comprising a fourth layer, wherein the fourth layer has a first surface and a second surface, wherein the first surface of the fourth layer is in adhering contact with the second surface of the third layer, wherein the fourth layer comprises: (1) at least one polyolefin having a density of 0.87 $g/cm^3$ to 0.97 $g/cm^3$, wherein the fourth layer comprises at least 90 weight percent polyolefin based on the total weight of the fourth layer; and (2) from 0.05 weight percent to 5.0 weight percent of at least one polydimethylsiloxane, based on the total weight of the fourth layer, wherein at least one of the polydimethylsiloxane has a weight average molecular weight, Mw, of from 20,000 g/mol to 700,000 g/mol.

11. The multilayer film of claim 10 further comprising a fifth layer, wherein the fifth layer has a first surface and a second surface, wherein the first surface of the fifth layer is in adhering contact with the second surface of the fourth layer, wherein the second surface of the fifth layer is an outermost surface of the film, and wherein the fifth layer comprises polypropylene, LLDPE, MDPE, HDPE, or a combination thereof.

12. The multilayer film of claim 1, wherein the multilayer film comprises five to eleven layers.

13. The multilayer film of claim 1, wherein the thickness of the third layer is 0.5% to 15% of the total thickness of the film.

14. The multilayer film of claim 1, wherein the film has a total thickness of 1 mil (25.4 microns) to 10 mils (254 microns).

15. An article comprising a multilayer film according to claim 1.

16. A laminate comprising a multilayer film according to claim 1 adhered to a substrate, wherein the substrate comprises polyethylene terephthalate, polypropylene, polyethylene, or polyamide.

17. The laminate of claim 16, wherein the substrate is polypropylene or polyethylene.

* * * * *